United States Patent
Piraino

(10) Patent No.: US 10,518,718 B2
(45) Date of Patent: Dec. 31, 2019

(54) MOUNTING ASSEMBLY FOR WHEEL CHOCK

(71) Applicant: Caterpillar Inc., Peoria, IL (US)

(72) Inventor: Anthony James Piraino, Oakley, IL (US)

(73) Assignee: Caterpillar Inc., Peoria, IL (US)

( * ) Notice: Subject to any disclaimer, the term of this patent is extended or adjusted under 35 U.S.C. 154(b) by 78 days.

(21) Appl. No.: 15/687,579

(22) Filed: Aug. 28, 2017

(65) Prior Publication Data
US 2019/0061642 A1    Feb. 28, 2019

(51) Int. Cl.
| | |
|---|---|
| *B60T 3/00* | (2006.01) |
| *B60R 11/06* | (2006.01) |
| *E02F 5/32* | (2006.01) |
| *E02F 9/00* | (2006.01) |
| *E02F 3/96* | (2006.01) |
| *B60R 11/00* | (2006.01) |
| *E02F 3/76* | (2006.01) |

(52) U.S. Cl.
CPC ............... *B60R 11/06* (2013.01); *B60T 3/00* (2013.01); *E02F 3/962* (2013.01); *E02F 5/32* (2013.01); *E02F 9/00* (2013.01); *B60R 2011/004* (2013.01); *B60R 2011/0052* (2013.01); *E02F 3/764* (2013.01); *E02F 3/765* (2013.01)

(58) Field of Classification Search
CPC ........................................................ B60T 3/00
USPC ........................................................ 172/776
See application file for complete search history.

(56) References Cited

U.S. PATENT DOCUMENTS

| | | | | |
|---|---|---|---|---|
| 3,902,574 | A | * | 9/1975 | Wright ...................... B60T 1/14 188/36 |
| 4,056,250 | A | * | 11/1977 | Uchiyama ............... E02F 3/382 248/674 |
| 5,439,076 | A | * | 8/1995 | Percy, Jr. .................. B60T 1/14 188/4 R |
| 5,497,857 | A | * | 3/1996 | Warren .................... B60T 1/14 188/4 R |
| 5,738,260 | A | | 4/1998 | Kirtland |
| 5,941,589 | A | | 8/1999 | Perlman et al. |
| 7,938,301 | B2 | * | 5/2011 | Aurbeck ................ B62D 25/18 116/50 |

FOREIGN PATENT DOCUMENTS

| | | |
|---|---|---|
| CN | 205044720 | 2/2016 |
| DE | 202009012274 | 11/2009 |
| GB | 2521529 | 6/2015 |

\* cited by examiner

*Primary Examiner* — Gary S Hartmann
(74) *Attorney, Agent, or Firm* — Oblon, McClelland, Maier & Neustadt

(57) ABSTRACT

A mounting assembly for a chock block for a wheel of a machine includes a first bracket configured to be attached to a pocket of a ripper of the machine. The first bracket includes a central plate and two side plates extending from the central plate. The mounting assembly also includes a second bracket configured to be attached to the first bracket. The second bracket includes a pair of support rods extending therefrom. The pair of support rods is configured to removably mount the chock block thereon.

20 Claims, 5 Drawing Sheets

US 10,518,718 B2

MOUNTING ASSEMBLY FOR WHEEL CHOCK

TECHNICAL FIELD

The present disclosure relates to a mounting assembly, and more particularly to the mounting assembly for a wheel chock of a machine.

BACKGROUND

Mobile machines, for example motor graders, may have wheel chocks that are put on ground and in contact with front and rear portions of wheels of the machine when the machine is parked at a given location. The wheel chocks are positioned on the ground when the machine is stationary and need to be removed from this position when the machine is in motion or when the machine has not yet been parked at the specific location.

However, when the machine is in motion, there may be difficulty in storage of the wheel chocks in a convenient location such that the wheel chocks may be later accessed for use on the wheels of the machine. For example, if the machine is initially parked at a first location, then in the course of performing a task or otherwise is moved to a second location, it may be inconvenient to disassemble the wheel chocks, store the wheel chocks separately, and then transport the wheel chocks to the new location of the machine for use on the wheels.

Hence, there is a need for an improved system for the storage of the wheel chocks of the machine.

SUMMARY OF THE DISCLOSURE

In one aspect of the present disclosure, a mounting assembly for a chock block for a wheel of a machine is provided. The mounting assembly includes a first bracket configured to be attached to a pocket of a ripper of the machine. The first bracket includes a central plate and two side plates extending from the central plate. The mounting assembly also includes a second bracket configured to be attached to the first bracket. The second bracket includes a pair of support rods extending therefrom. The pair of support rods is configured to removably mount the chock block thereon.

In another aspect of the present disclosure, a machine is provided. The machine includes an engine, a frame, a ripper attached to the frame, a set of wheels attached to frame, and a mounting assembly for a chock block for the set of wheels. The mounting assembly includes a first bracket configured to be attached to a pocket of the ripper. The first bracket includes a central plate and two side plates extending from the central plate. The mounting assembly a second bracket is configured to be attached to the first bracket. The second bracket includes a pair of support rods extending therefrom. The pair of support rods is configured to removably mount the chock block thereon.

In yet another aspect of the present disclosure, a first bracket for supporting a second bracket having support rods for receiving a chock block is provided. The first bracket includes a central plate and two side plates extending from the central plate. The central plate defines an outer surface for receiving the second bracket and an inner surface configured to be in abutting relationship with a rear face of a pocket of a ripper. The two side plates extend away from the outer surface. Each of the two side plates have facing inner surfaces and each inner surface is configured to be in abutting relationship with a side face of the pocket of the ripper. The two side plates further have an aperture configured to receive a pin that extends through the respective side plate and the pocket of the ripper.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
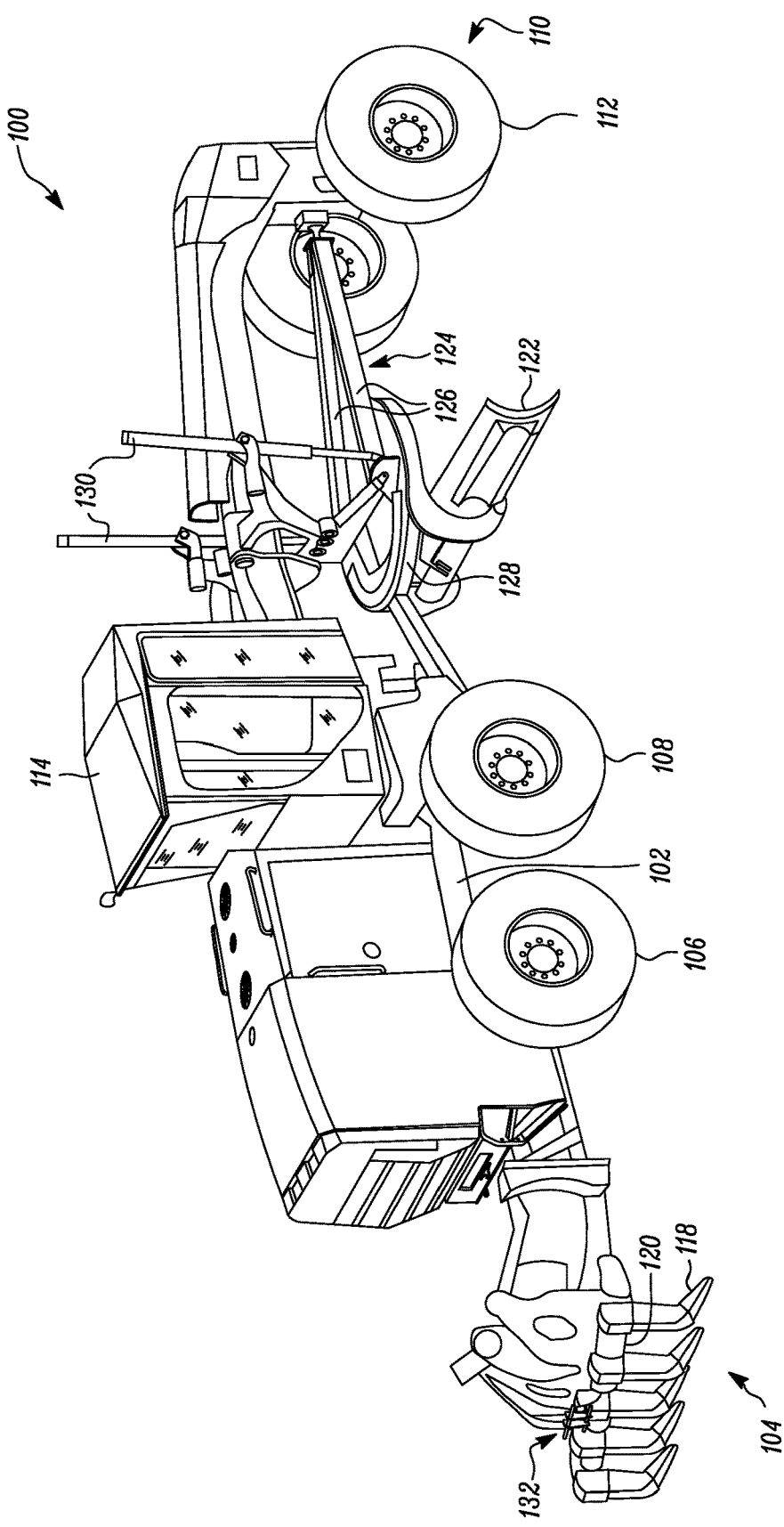
FIG. 1 is a perspective view of an exemplary machine, according to various concepts of the present disclosure.

Referring to FIG. 1, an exemplary machine 100 is illustrated. The machine 100 is embodied as a motor grader. Although the machine 100 described herein is the motor grader, alternatively, the concepts of the present disclosure are equally applicable to other machines having a ripper work tool. The machine 100 includes a main frame 102. A rear end 104 of the main frame 102 is supported by rear wheels 106, 108. A front end 110 of the main frame is supported by front wheels 112. The main frame 102 supports an engine (not shown) and an operator cab 114, as one of ordinary skill in the art will readily understand.

The rear and front wheels 106, 108, 112 may be powered by a hydrostatic transmission (not shown). A ripper 116 is coupled to the rear end 104 of the machine 100. The ripper 116 includes a number of downwardly directed tines or claws 118 extending from a horizontal frame 120. Hydraulic cylinders are attached to the ripper 116 for raising and lowering the ripper 116. When lowered, the claws 118 engage with the ground such that when the machine 100 moves forward the ground is displaced.

Downwardly depending from the main frame 102 is a work blade 122. The work blade 122 may be mounted on a drawbar-circle-moldboard (DCM) 124. The DCM 124 may include a drawbar 126 connected to a circle 128. The circle 128 may include a set of circular gear teeth (not shown) for allowing rotation of the work blade 122. In other embodiments, different mechanical or hydraulic arrangements can be provided to allow for rotation of the work blade 122, while in still other embodiments, specialized tools other than the work blade 122 may be mounted on the DCM 124. Hydraulic cylinders 130 are provided to raise and lower the DCM 124 and the work blade 122 as a whole.

The present disclosure relates to a mounting assembly 132 for a chock block 402 (see FIG. 4) for the rear and front wheels 106, 108, 112 of the machine 100. The chock block 402 or wheel chock is used for restraining movement of stationary machines. More specifically, the chock block 402 is made of a flexible material and has a block-like appearance. A person of ordinary skill in the art will appreciate that the chock block 402 is removably attachable to the rear and/or front wheels 106, 108, 112 of the machine 100 to hold the respective wheels of the machine 100 when the machine 100 is parked in a location.

Referring to FIGS. 2 to 5, the mounting assembly 132 includes a first bracket 202 and a second bracket 302. The first bracket 202 is attachable to the machine 100 and the second bracket 302 is attachable to the first bracket 202. Further, the chock blocks 402 may be mounted on the second bracket 302, such that the chock blocks 402 are accommodated on the machine 100 itself when not being used in connection with the rear and/or front wheels 106, 108, 112 of the machine 100. For example, while the machine 100 is in motion, the chock blocks 402 may be stored on the second bracket 302 which in turn is attached to the first bracket 202 that is attached to the machine 100.

Figure 2:
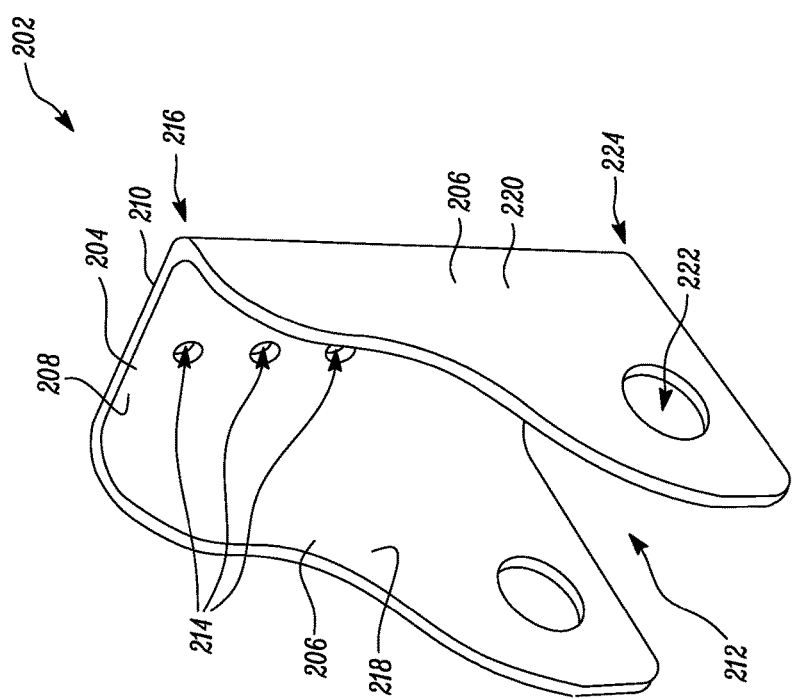
FIG. 2 is a perspective view of a first bracket of a mounting assembly associated with the machine, according to various concepts of the present disclosure.

Referring to the accompanying figures, the mounting assembly 132 will now be explained in detail. As shown in FIG. 2, the first bracket 202 of the mounting assembly 132 includes a central plate 204 and two side plates 206 extending from the central plate 204. The central plate 204 has an inner surface 208 and an outer surface 210. As described earlier, the first bracket 202 is installed on a pocket 304 (see FIG. 3) of the ripper 116. The inner surface 208 of the central plate 204 is in contact with a rear face 306 of the pocket 304 of the ripper 116 when installed. A width of the central plate 204 corresponds to dimensions of the pocket 304. The width of the central plate 204 is so chosen that the first bracket 202 fits around the pocket 304 such that the pocket 304 is received into a cavity 212 defined by the central plate 204 and the two side plates 206.

Further, the outer surface 210 of the central plate 204 is configured to contact and be in an abutting relationship with the second bracket 302. The central plate 204 includes a number of holes 214 provided at a first end 216 of the first bracket 202. In the illustrated example, three holes 214 are provided in a spaced apart arrangement along a length of the central plate 204. The number of holes, dimensions, and placement of the holes 214 may vary without any limitation. The holes 214 are configured to receive mechanical fasteners 404 (see FIG. 4), such as bolts, for connecting the first bracket 202 to the second bracket 302.

Figure 3:
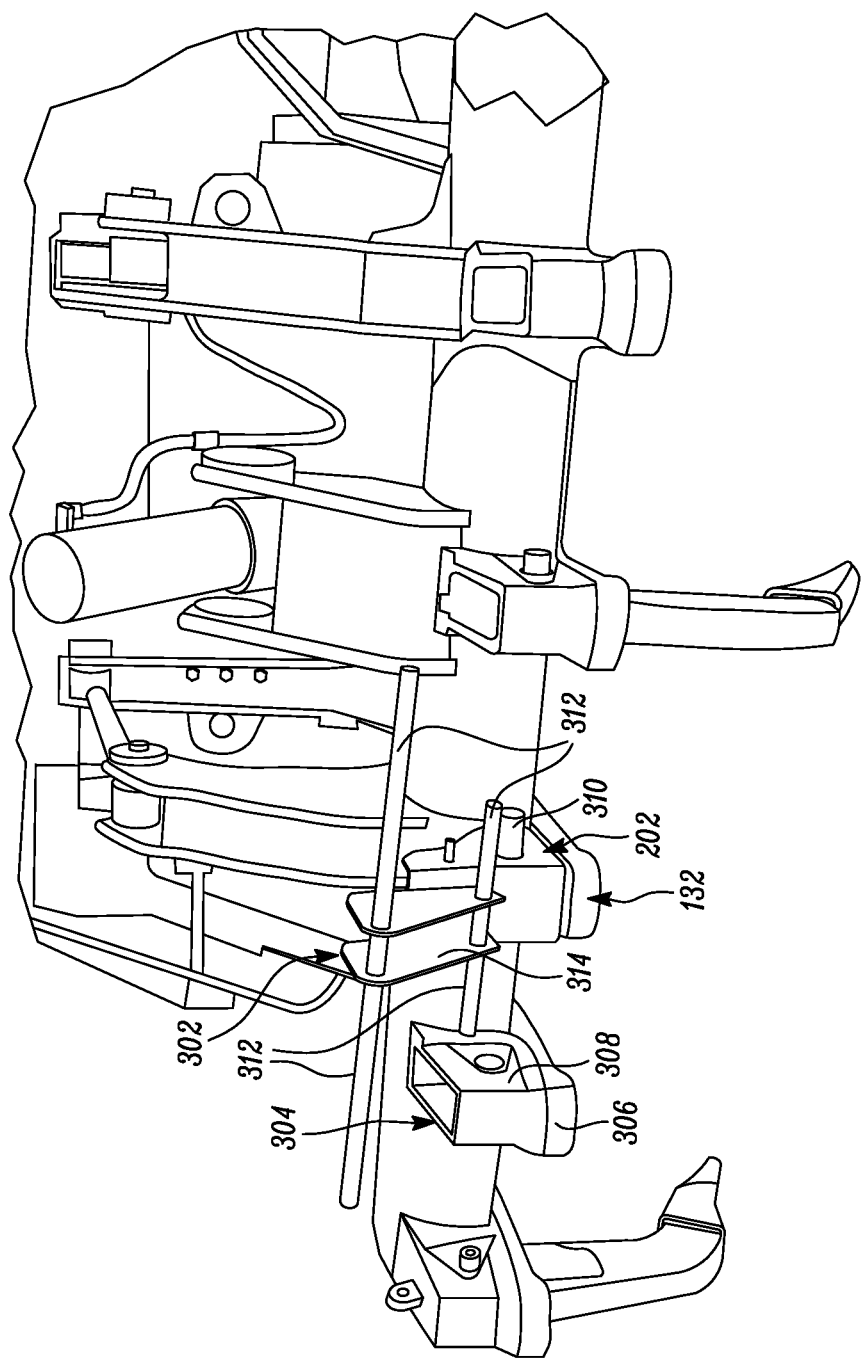
FIG. 3 is a perspective view of a ripper of the machine and the mounting assembly, according to various concepts of the present disclosure.

The two side plates 206 extend perpendicularly from the central plate 204. Also, the two side plates 206 are generally parallel to each other. Each of the two side plates 206 has an inner surface 218 and an outer surface 220. When installed, the inner surface 218 of each of the two side plates 206 contacts with a side face 308 of the pocket 304 of the ripper 116. A width of each of the two side plates 206 is based on the dimensions of the pocket 304 of the ripper 116 such that the first bracket 202 sits on the pocket 304 of the ripper 116 in an upright position as shown in FIGS. 3 to 5.

Each of the two side plates 206 includes an aperture 222 provided proximate to a second end 224 of the first bracket 202. The apertures 222 are axially aligned to receive a pin 310 therethrough. Also, the apertures 222 of the two side plates 206 are aligned with corresponding holes (not shown) provided on the side faces 308 of the pocket 304 of the ripper 116. The pin 310 passes through the side faces of the pocket 304 of the ripper 116 and each of the two side plates 206 of the first bracket 202. In some examples, the apertures 222 of the two side plates 206 are additionally aligned with holes of a ripper shank such that the pin 310 passes through the side plates 206 of the first bracket 202, the pocket 304 of the ripper 116, and the ripper shank. On attachment to the machine, the first bracket 202 extends vertically upwards and perpendicular to a horizontal frame 120 of the ripper 116. Further, the first bracket 202 sits on the pocket 304 of the ripper 116 and is held firmly in position by the pin 310.

As described earlier, the second bracket 302 is attached to the first bracket 202. The second bracket 302 has a pair of support rods 312 extending from each side of a main body 314 of the second bracket 302. The pair of support rods 312 provides support to the chock block 402. Referring to FIG. 3, the second bracket 302 in shown attached to the first bracket 202. The second bracket 302 extends outwards and away from the horizontal frame 120 of the ripper 116. In some examples, the support rods 312 provided on each side have different lengths. Also, one of the support rods 312 on each side is positioned offset to the other support rod 312.

Figure 4:
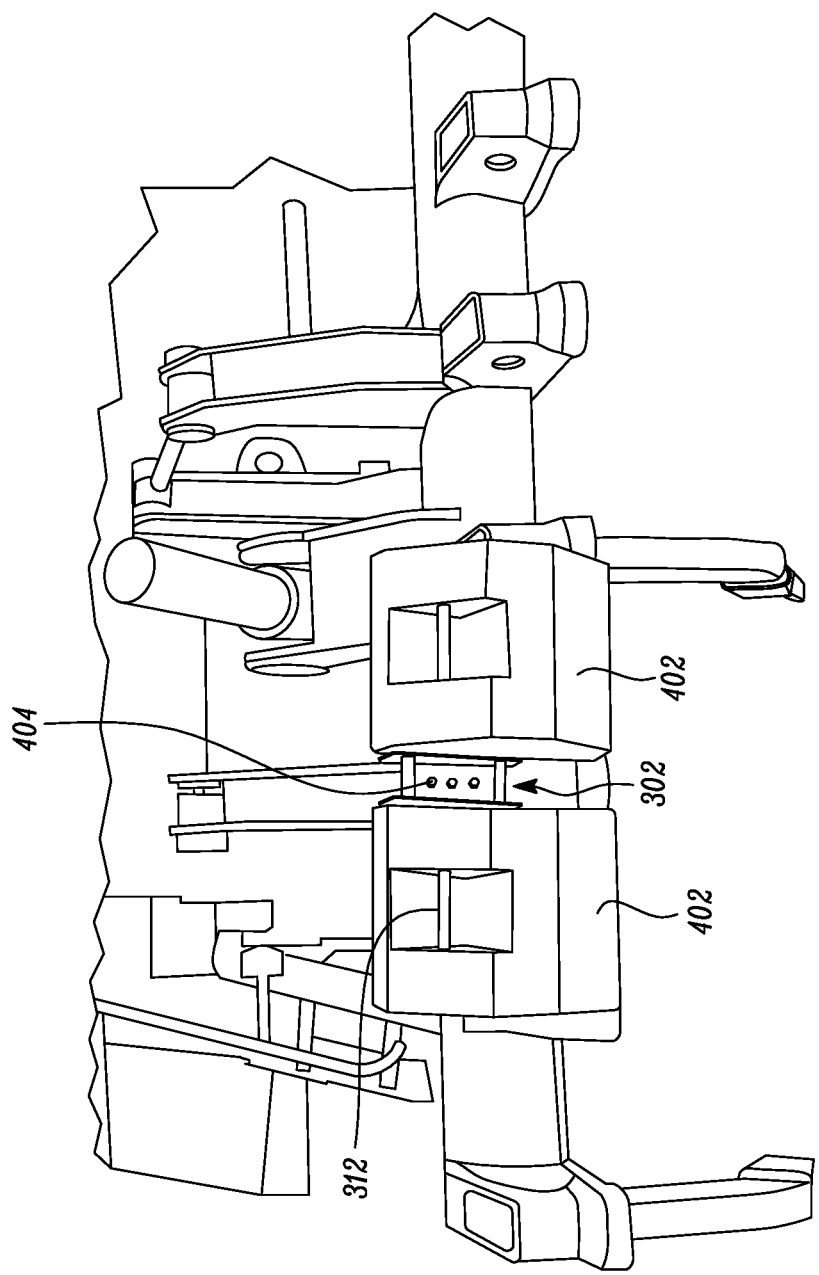
FIG. 4 is a rear view of the ripper of the machine with the mounting assembly and chock blocks installed thereon, according to various concepts of the present disclosure.
Figure 5:
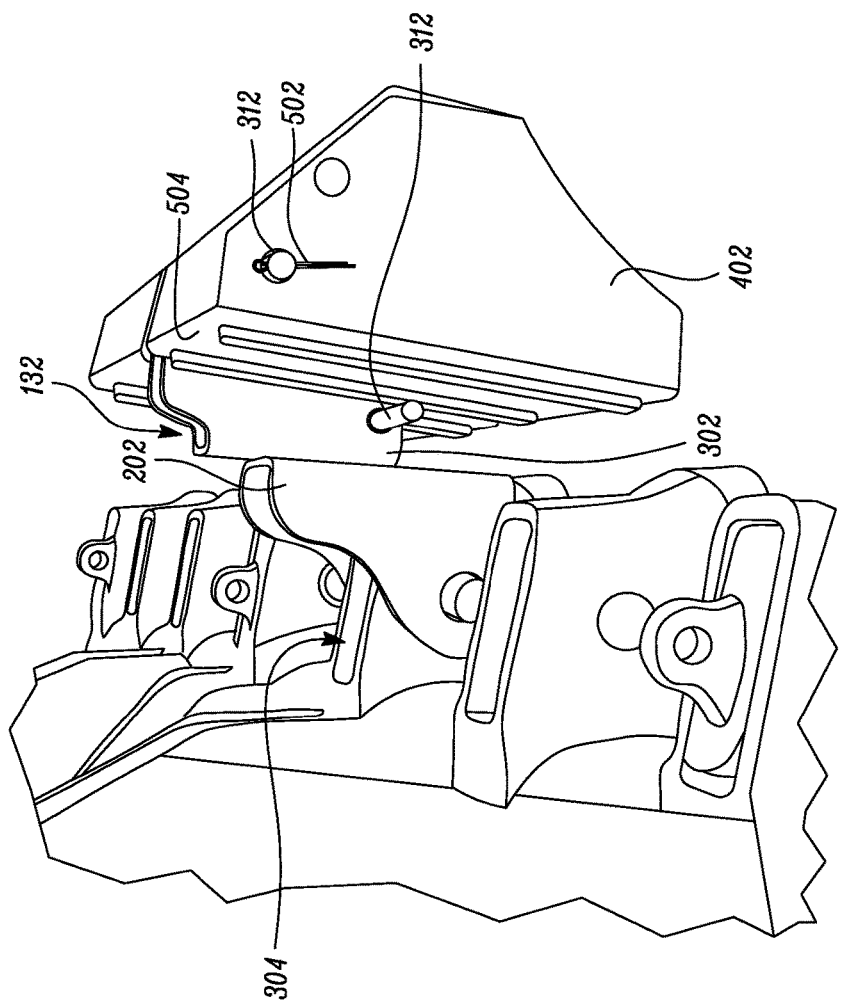
FIG. 5 is a side view of the ripper, the mounting assembly, and the chock blocks, according to various concepts of the present disclosure.

Referring to FIGS. 4 and 5, the chock blocks 402 may be received onto each side of the second bracket 302, such that one of the support rods 312 on each side of the second bracket 302 is received into a corresponding internal channel provided on the chock block 402. An end of each of the support rods 312 may be configured to receive a retention pin 502 (see FIG. 5) to retain the chock block 402 in position. The other support rod 312 may provide a resting surface for the chock block 402 by contacting with a first surface 504 of the chock block 402 and preventing the chock block 402 from swinging towards the horizontal frame 120 of the ripper 116.

As shown, the pair of chock blocks 402 installed on each side of the main body 314 of the second bracket 302 are stored on the machine 100 such that the pair of the chock blocks 402 are stored in a position perpendicular to the horizontal frame 120 of the ripper 116. Although one mounting assembly 132 is shown in the accompanying figures, based on the requirements additional similar mounting assemblies 132 may be connected to the machine 100.

The first and second brackets 202, 302 are each unitary components and may be made of any suitable metal. Dimensions of the first and second brackets 202, 302 may vary based on the dimensions of the pocket 304 of the ripper 116. Further, the mounting assembly 132 may be mounted on any pocket 304 of the ripper 116 of the machine 100 and is not limited to the specific pocket 304 shown in the accompanying figures.

INDUSTRIAL APPLICABILITY

The present disclosure provides the mounting assembly 132 for storage of the chock block 402 on the machine 100. The first bracket 202 may easily be fitted onto the pocket 304 of the machine 100. Further, the second bracket 302 is attached to the first bracket 202 and the chock block 402 may be stored on the second bracket 302. The mounting assembly 132 provides a cost effective, easy to install, and convenient solution for storage of the chock block 402 on the machine 100 when not in use. By storing the chock blocks 402 on the machine 100 itself, the chock blocks 402 inherently move with the machine 100 and can be easily removed for use on the rear and/or front wheels 106, 108, 112 of the machine 100 at the new location. Thus, the chock blocks 402 need not be separately transported to the location of the machine 100, saving time and providing an efficient solution.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A mounting assembly for a chock block for a wheel of a machine, the mounting assembly comprising:
    a first bracket that is attachable to a housing that defines a pocket of a ripper of the machine, the first bracket including a central plate and two side plates extending from the central plate; and
    a second bracket that is directly attached to the first bracket, the second bracket including a pair of support rods extending from a body thereof, wherein the pair of support rods removably mount the chock block to the mounting assembly.

2. The mounting assembly of claim 1, wherein each of the two side plates of the first bracket includes an aperture provided thereon to receive a pin therethrough.

3. The mounting assembly of claim 2, wherein the aperture provided on each of the two side plates is provided such that the aperture is axially aligned with corresponding holes of the housing that defines the pocket to receive the pin through each aperture and the holes of the housing that defines the pocket.

4. The mounting assembly of claim 3, wherein the pin is to pass through a corresponding hole provided on a ripper shank.

5. The mounting assembly of claim 1, wherein the central plate further includes a plurality of holes provided thereon to receive mechanical fasteners therethrough to connect the first and second brackets with each other.

6. The mounting assembly of claim 1, wherein a width of the central plate of the first bracket is greater than a width of a rear surface of the housing that defines the pocket of the ripper such that the housing is between the two side plates when the first bracket is removably attached to the housing.

7. The mounting assembly of claim 1, wherein each of the two side plates extends perpendicularly from the central plate, and the two side plates are parallel to each other.

8. The mounting assembly of claim 1, wherein a width of each of the two side plates of the first bracket is no greater than a width of a sidewall of the housing that defines the pocket of the ripper.

9. The mounting assembly of claim 1, wherein the pair of support rods are parallel to each other and the central plate of the first bracket and extend from opposite sides of the body of the second bracket.

10. The mounting assembly of claim 1, wherein the support rods are at different heights relative to each other.

11. The mounting assembly of claim 1, wherein a first support rod of the pair extends through the chock block and a second support rod of the pair supports an external surface of the chock block when the chock block is removably mounted to the pair of support rods.

12. A machine comprising:
    an engine;
    a frame;
    a ripper attached to the frame;
    a set of wheels attached to frame; and
    a mounting assembly for a chock block for the set of wheels, the mounting assembly comprising:
    a first bracket that is removably attached to a housing that defines a pocket of the ripper, the first bracket including a central plate and two side plates extending from the central plate that removably attach the first bracket to the housing that defines the pocket of the ripper; and
    a second bracket that is attached to the first bracket, the second bracket including a pair of support rods extending from a body thereof, wherein the pair of support rods removably mount the chock block to the mounting assembly.

13. The machine of claim 12, wherein each of the two side plates of the first bracket includes an aperture provided thereon to receive a pin therethrough.

14. The machine of claim 13, wherein the aperture provided on each of the two side plates is provided such that the aperture is axially aligned with corresponding holes of the housing that defines the pocket of the ripper to receive the pin through each aperture and the holes of the housing that defines the pocket when the first bracket is removably attached to the housing.

15. The machine of claim 14, wherein the pin further passes through a corresponding hole provided on a ripper shank.

16. The machine of claim 12, wherein the central plate further includes a plurality of holes provided thereon to receive mechanical fasteners therethrough to connect the first and second brackets with each other.

17. The machine of claim 12, wherein a width of the central plate of the first bracket is greater than a rear surface of the housing that defines of the pocket of the ripper such that the housing is between the two side plates when the first bracket is removably attached to the housing.

18. The machine of claim 9, wherein each of the two side plates extends perpendicularly from the central plate, and the two side plates are parallel to each other.

19. The machine of claim 12, wherein a width of each of the two side plates of the first bracket is no greater than a width of a sidewall of the housing that defines the pocket of the ripper.

20. The machine of claim 12, wherein the second bracket is directly attached to the first bracket.

* * * * *